United States Patent [19]

Groebke et al.

[11] 4,049,642
[45] Sept. 20, 1977

[54] PHENYL-AZO-NAPHTHYL DYES HAVING A 2-ACYLOXY, ALKOXY OR HYDROXY-1-ARYLETHYL AMINO GROUP IN THE 4-POSITION OF THE NAPHTHALENE RING

[75] Inventors: Wolfgang Groebke, Oberwil; Klaus Körte, Therwil, both of Switzerland

[73] Assignee: Sandoz Ltd., Basel, Switzerland

[21] Appl. No.: 704,718

[22] Filed: July 12, 1976

Related U.S. Application Data

[63] Continuation-in-part of Ser. No. 538,376, Jan. 3, 1975, abandoned.

[30] Foreign Application Priority Data

Jan. 11, 1974 Switzerland .................... 352/74

[51] Int. Cl.² .............. C09B 29/06; C09B 29/28; D06P 3/24; D06P 3/52
[52] U.S. Cl. .................................... 260/196; 8/41 B; 8/41 C; 260/197; 260/198; 260/199
[58] Field of Search ............ 260/196, 198, 199, 207.1, 260/207.5

[56] References Cited

U.S. PATENT DOCUMENTS 2,386,599  10/1945  Dickey et al. .................. 260/155

FOREIGN PATENT DOCUMENTS 2,101,912  7/1971  Germany .................. 260/207.1

*Primary Examiner*—Daniel E. Wyman
*Assistant Examiner*—John J. Doll
*Attorney, Agent, or Firm*—Gerald D. Sharkin; Richard E. Vila; Melvyn M. Kassenoff

[57] ABSTRACT

Compounds of the formula,

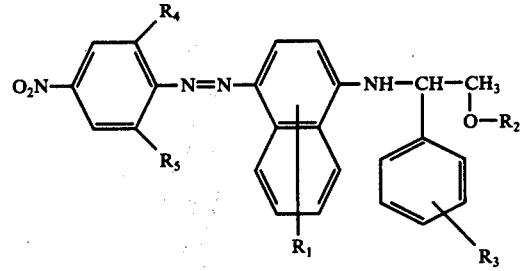

in which
R₁ and R₃, which may be the same or different, each signifies hydrogen, hydroxyl, chlorine, bromine, alkyl($C_{1-4}$), alkoxy($C_{1-4}$), alkyl($C_{1-4}$)-carbonyl, alkoxy($C_{1-4}$)-carbonyl, alkyl($C_{1-4}$)-carbonylamino or alkoxy($C_{1-4}$)-carbonylamino,
R₂ signifies hydrogen; alkyl($C_{1-4}$)-carbonyl; alkoxy($C_{1-4}$)-carbonyl; benzoyl; unsubstituted alkyl($C_{1-4}$); or alkyl($C_{1-4}$) monosubstituted by alkoxy($C_{1-4}$), phenoxy, benzyloxy, halo or hydroxy,
R₄ signifies nitro or cyano, and
R₅ signifies chlorine or bromine, their production and use as disperse dyes for substrates comprising high molecular weight hydrophobic polymers such as polyesters, cellulose acetates and synthetic polyamides. The dyeings exhibit good fastness to light, heat treatments, wet treatments, solvents, lubricants, rubbing, cross-dyeing, ozone, flue gas and chlorine.

28 Claims, No Drawings

PHENYL-AZO-NAPHTHYL DYES HAVING A 2-ACYLOXY, ALKOXY OR HYDROXY-1-ARYLETHYL AMINO GROUP IN THE 4-POSITION OF THE NAPHTHALENE RING

This application is a continuation-in-part of application Ser. No. 538,376, filed Jan. 3, 1975 and now abandoned.

The invention relates to amino monoazo compounds, their production and use as disperse dyes.

Thus, the invention provides compounds of formula I,

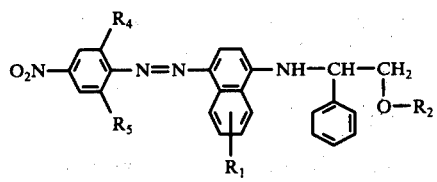

formerly believed to be of formula X,

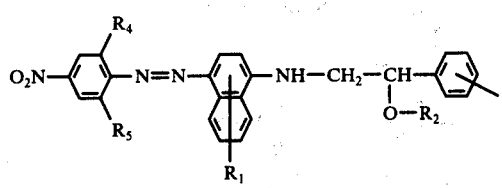

in which
$R_1$ and $R_3$, which may be the same or different, each signifies hydrogen, hydroxyl, chlorine, bromine, alkyl($C_{1-4}$), alkoxy($C_{1-4}$), alkyl ($C_{1-4}$)-carbonyl, alkoxy($C_{1-4}$)-carbonyl, alkyl($C_{(1-4)}$)-carbonylamino or alkoxy($C_{1-4}$)-carbonylamino,
$R_2$ signifies hydrogen; alkyl($C_{1-4}$)-carbonyl; alkoxy($C_{1-4}$)-carbonyl; benzoyl; unsubstituted alkyl($C_{1-4}$); or alkyl($C_{1-4}$)monosubstituted by alkoxy($C_{1-4}$), phenoxy, benzyloxy, halo or hydroxy,
$R_4$ signifies nitro or cyano, and
$R_5$ signifies chlorine or bromine.

$R_1$ is preferably hydrogen or alkoxy (particularly methoxy), more preferably hydrogen. Any haloalkyl as $R_2$ is preferably chloro- or bromo-alkyl. Any alkyl as $R_2$ is preferably unsubstituted, $R_2$ preferably being hydrogen, alkylcarbonyl, alkoxycarbonyl or benzoyl, more preferably hydrogen, acetyl, propionyl or alkoxy($C_{1-4}$)carbonyl. $R_3$ is perferably hydrogen or alkyl (particularly methyl), more preferably hydrogen.

The preferred compounds of formula I are those wherein $R_1$ is hydrogen or alkoxy, $R_2$ is hydrogen, alkylcarbonyl, alkoxycarbonyl or benzoyl, and $R_3$ is hydrogen or methyl. Even more preferred are the compounds of formula I wherein $R_1$ is hydrogen, $R_2$ is hydrogen, acetyl, propionyl or alkoxycarbonyl, and $R_3$ is hydrogen. Also preferred are the compounds of formula I wherein $R_1$ is hydrogen, $R_2$ is hydrogen, alkylcarbonyl, alkoxycarbonyl or benzoyl, and $R_3$ is hydrogen or methyl, (particularly hydrogen), with the compounds of formula I wherein $R_1$ is hydrogen, $R_2$ is hydrogen, acetyl, propionyl or alkoxycarbonyl, and $R_3$ is hydrogen or methyl (particularly hydrogen) being even more preferred.

The invention also provides a process for the production of compounds of formula I, above, comprising coupling the diazotised derivative of an amine of formula II,

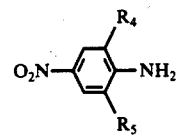

in which $R_4$ and $R_5$ are as defined above, with a compound of formula III,

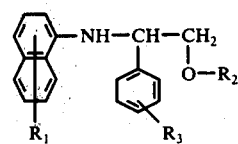

formerly believed to be of formula XIII,

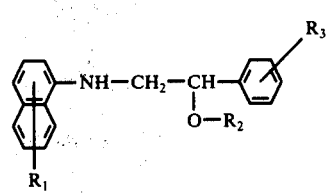

in which $R_1$, $R_2$ and $R_3$ are as defined above.

The process is carried out in conventional manner, conveniently being effected in an acid, preferably buffered, medium, e.g. at a pH of less than 5. The temperature employed is less than 20° C, preferably from −5° C to +5° C. Suitable buffers for the reaction include alkali metal salts of low molecular carboxylic acids, e.g. of acetic or propionic acid, sodium acetate being preferred. The diazotisation of the amine of formula II is likewise carried out in conventional manner.

The resulting compounds of formula I may be isolated and purified.

Interconversion from one compound of formula I to another is, as will be appreciated, possible. Thus, compounds in which $R_2$ is hydrogen, may be converted into compounds wherein $R_2$ is $C_{1-4}$alkyl- or alkoxy-carbonyl or benzoyl by acylation, e.g. by reaction with a compound of the formula X-CO-$R_6$, in which $R_6$ is $C_{1-4}$alkyl, $C_{1-4}$alkoxy or phenyl, and X is —OH, C( or Br, or with an anhydride thereof when X is —OH, such reaction being carried out in conventional manner.

The compounds of formulae II and III are either known or may be produced from available starting materials in conventional manner. Thus, the compounds of formula III may be obtain in analogous manner to that described in U.S. Pat. No. 2,882,269, it previously being believed that the reaction scheme was as follows:

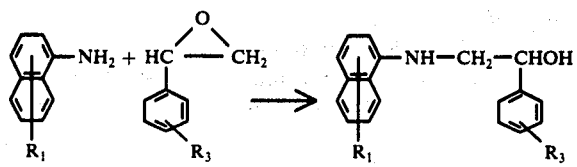

i.e. analogous to that set out in said U.S. Pat. for the reaction of meta-toluidine or N-methylaniline with styrene oxide. However, we have now found that, in fact, the reaction scheme is as follows:

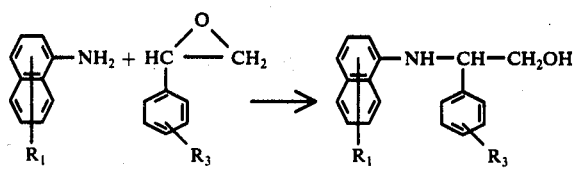

i.e. with the optionally substituted phenyl in the compound III on the 1-position $R_1$ and not on the 2-position of the 2-hydroxyethylamino group, this having been ascertained from NMR and mass spectroscopy data.

The compounds of formula III, in which $R_2$ is hydrogen may be converted into compounds in which $R_2$ is unsubstituted or substituted alkyl by first exchanging the —$OR_2$ (—OH) group for chloro and then reacting with the desired alcoholate, e.g. sodium alcoholate. Such exchange and reaction may be carried out in conventional manner.

The compounds of formula I are useful as disperse dyes, particularly after working up into dyeing preparations in known manner, e.g. by grinding in the presence of dispersing and/or filling agents, optionally with subsequent spray or vacuum drying.

From aqeous media the compounds show good affinity for textile substrates, whether in fibre, filament woven, non-woven or knitted from, and comprising fully or semi-synthetic, hydrophobic, high molecular weight polymers, particularly linear, aromatic polyesters, cellulose 2½ acetate, cellulose triacetate and synthetic polyamides.

The compounds may be applied in conventional manner, e.g. by padding or printing techniques and from a long or short liquor, e.g. as described in French Pat. 1,445,371.

The dyeings obtained, in general, show good fastness properties, e.g. to light, sublimation, thermosetting, thermofixation, pleating, water, sea-water, washing, perspiration, solvents, e.g. dry cleaning solvents, lubricants, rubbing, cross-dyeing, ozone, flue gas and chlorine and resistance properties to permanent pressing processes and soil release finishes. The dischargeability, resistance to reduction and the reserving of wool and cotton are good, as is the stability to varied pH conditions.

The invention is illustrated by the following Examples in which all parts are by weight and the temperatures in degrees Centigrade.

EXAMPLE 1

8 Parts crystalline sodium nitrite are slowly added to 147 parts concentrated sulphuric acid at 60° with stirring. The solution is cooled to 10°-20°, 10 parts glacial acetic acid are added, it is then cooled to 0°-5°, after which 26.2 parts 2-bromo-4,6-dinitroaniline are added. A further 10 parts glacial acetic acid are added, the whole is stirred for 3 hours at 0°-5° and the excess nitrosylsulphuric acid is broken down with urea.

The diazonium salt solution obtained is slowly added, with stirring, to a solution of 26.3 parts N-(2-hydroxy-1-phenylethyl)-α-naphthlamine, formerly believed to be N-(2-hydroxy-2-phenylethyl)-α-naphthylamine, in 10 parts glacial acetic acid which has been cooled to 0°-5°, the whole is buffered to give a pH of 2.5 with sodium acetate; the precipitate which forms is filtered off, washed until free from acid and dried. It dyes polyester fibre material in blue shades and the dyeings have notable fastness properties.

EXAMPLE 2

To a solution of 53 parts of the dye produced according to Example 1 of the formula

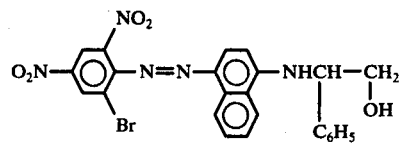

formerly believed to be of the formula

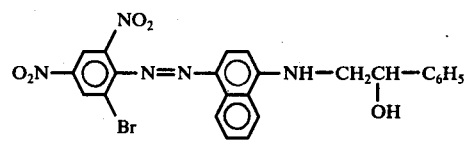

, in 16 parts pyridine are added slowly, at 5°-10°, with stirring, 13.6 parts chloroformic acid butyl ester; the mixture obtained is dispersed in 20 parts dilute hydrochloric acid; the precipitated dye is filtered off and washed with water until free from acid. The dye can be obtained in pure form by recrystallising from ethanol/dioxane. It dyes polyester fibre material in brilliant, reddish-blue shades and the dyeings have notable fastness properties.

The dyes in the following Table correspond to the formula

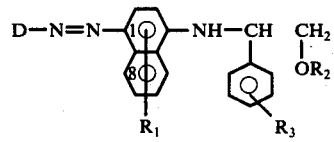

formerly believed to be of the formula

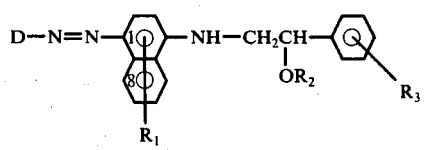

They are produced in a similar way to that described in Examples 1 and 2 and are all blue to reddish-blue. In the Table, $R_1$ and $R_3$ are hydrogen except where otherwise specified.

Table

| Exp. No. | D | $R_2$ |
|---|---|---|
| 3 | 2,4-dinitro-6-bromophenyl | —COCH$_3$ |
| 4 | " | —COOC$_2$H$_5$ |
| 5 | 2-bromo-4-nitro-6-cyanophenyl | H |
| 6 | " | —COOC$_4$H$_9$ |
| 7 | 2,4-dinitro-6-chlorophenyl | —COCH$_3$ |
| 8 | " | H |
| 9 | 2-bromo-4-nitro-6-cyanophenyl | —COCH$_3$ |
| 10 | 2,4-dinitro-6-chlorophenyl | —COOC$_4$H$_9$ |
| 11 | " | —COC$_6$H$_5$ |
| 12 | " | —COC$_2$H$_5$ |
| 13 | " | —C$_2$H$_5$ |
| 14 | 2,4-dinitro-6-bromophenyl | —COC$_2$H$_5$ $R_3$=4-CH$_3$ |
| 15 | " | —COOCH$_3$ $R_1$=8-OCH$_3$ |

APPLICATION EXAMPLE

7 Parts of the dye produced according to Example 1, together with 4 parts dinaphthyl methane disulphonic acid (sodium salt), 4 parts sodium cetyl sulphate and 5 parts anhydrous sodium sulphate are ground in a ball mill for 48 hours to give a fine powder.

1 Part of the dye preparation obtained is made into a paste with a little water and the resultant suspension is passed through a sieve into a dyebath containing 2 parts sodium lauryl sulphate in 4000 parts water. The liquor ratio is 1 : 40. 100 Parts scoured polyester fabric are then added to the bath at 40° to 50°, followed by 20 parts of a chlorinated benzene emulsified in water, the bath is heated slowly to 100° and dyeing is carried out for 1-2 hours at 95°-100°. The reddish-blue dyed fabric is washed, soaped, washed again and dried. The even dyeing has good depth of colour and is extremely fast to light, cross-dyeing, washing, water, sea water, perspiration, sublimation, flue gas, thermosetting, pleating and permanent pressing.

What is claimed is:

1. A compound of the formula

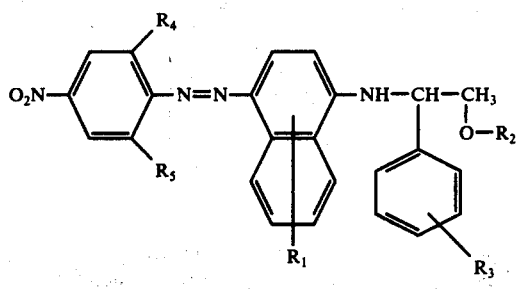

wherein each of
   $R_1$ and $R_3$ is independently hydrogen, hydroxy, chloro, bromo, C$_{1-4}$alkyl, C$_{1-4}$alkoxy, (C$_{1-4}$alkyl)carbonyl, (C$_{1-4}$alkoxy)carbonyl, (C$_{1-4}$alkyl)-carbonylamino or (C$_{1-4}$alkoxy)carbonylamino,
   $R_2$ is hydrogen, (C$_{1-4}$alkyl)carbonyl, (C$_{1-4}$alkoxy)carbonyl, benzoyl, C$_{1-4}$alkyl or C$_{1-4}$alkyl monosubstituted by C$_{1-4}$alkoxy, phenoxy, benzyloxy, halo or hydroxy,
   $R_4$ is nitro or cyano, and
   $R_5$ is chloro or bromo.

2. A compound according to claim 1 wherein $R_1$ is hydrogen or C$_{1-4}$alkoxy.

3. A compound according to claim 2 wherein $R_1$ is hydrogen.

4. A compound according to claim 3 wherein
   $R_2$ is hydrogen, acetyl, propionyl or (C$_{1-4}$alkoxy)carbonyl, and
   $R_3$ is hydrogen.

5. A compound according to claim 2 wherein
   $R_2$ is hydrogen, (C$_{1-4}$alkyl)carbonyl, (C$_{1-4}$alkoxy)-carbonyl or benzoyl, and
   $R_3$ is hydrogen or methyl.

6. A compound according to claim 5 wherein $R_2$ is hydrogen.

7. A compound according to claim 5 wherein $R_2$ is (C$_{1-4}$alkyl)carbonyl or benzoyl.

8. A compound according to claim 5 wherein $R_2$ is (C$_{1-4}$alkoxy)carbonyl.

9. A compound according to claim 1 wherein $R_2$ is hydrogen, (C$_{1-4}$alkyl)carbonyl, (C$_{1-4}$alkoxy)-carbonyl or benzoyl.

10. A compound according to claim 9 wherein $R_2$ is hydrogen, acetyl, propionyl or (C$_{1-4}$alkoxy)carbonyl.

11. A compound according to claim 10 wherein
    $R_1$ is hydrogen, and
    $R_3$ is hydrogen or methyl.

12. A compound according to claim 11 wherein $R_3$ is hydrogen.

13. A compound according to claim 9 wherein
    $R_1$ is hydrogen, and
    $R_3$ is hydrogen or methyl.

14. A compound according to claim 13 wherein $R_3$ is hydrogen.

15. A compound according to claim 1 wherein $R_3$ is hydrogen or methyl.

16. A compound according to claim 15 wherein $R_3$ is hydrogen.

17. The compound according to claim 16 having the formula

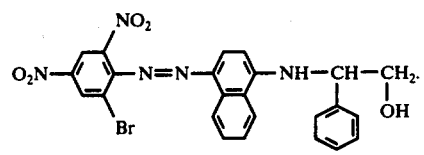

18. The compound according to claim 16 having the formula

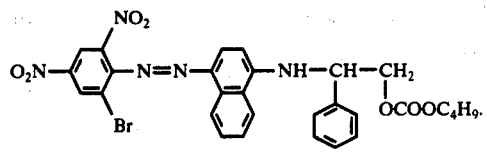

19. The compound according to claim 16 having the formula

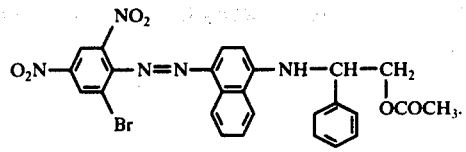

20. The compound according to claim 16 having the formula

21. The compound according to claim 16 having the formula

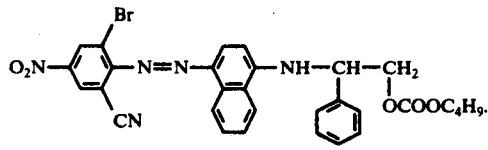

22. The compound according to claim 16 having the formula

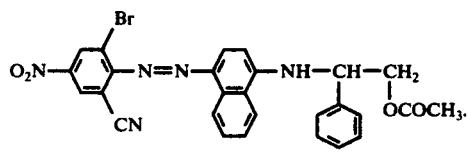

23. The compound according to claim 16 having the formula

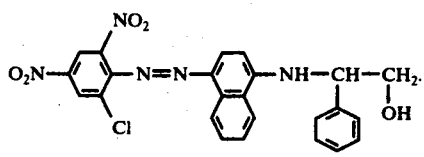

24. The compound according to claim 16 having the formula

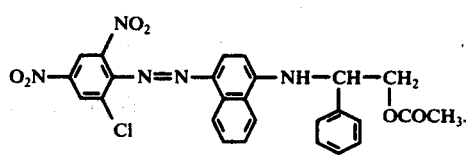

25. The compound according to claim 16 having the formula

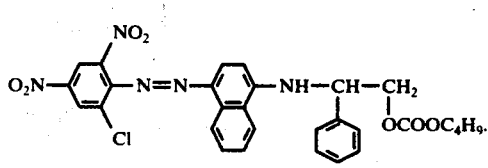

26. The compound according to claim 15 having the formula

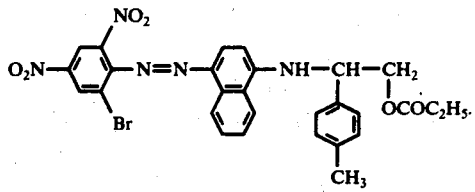

27. The compound according to claim 16 having the formula

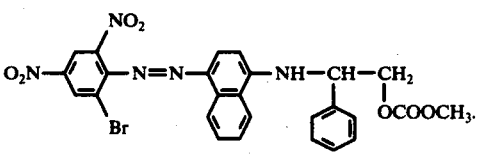

28. A dye obtained by coupling a diazotized derivative of an amine of the formula

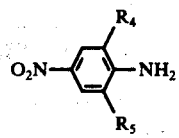

with the product of the reaction of a compound of the formula

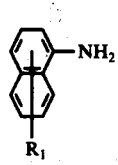

with a compound of the formula

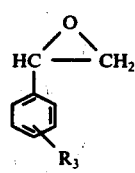

optionally after etherification with a $C_{1-4}$alkyl or $C_{1-4}$alkyl monosubstituted by $C_{1-4}$alkoxy, phenoxy, benzyloxy, halo or hydroxy group-introducing agent, and, after said coupling, optionally converting any remaining hydroxy group produced by cleavage of the oxygen-containing ring into a ($C_{1-4}$alkyl)- carbonyloxy, ($C_{1-4}$alkoxy)carbonyloxy or benzoyloxy group, wherein each of $R_1$ and $R_3$ is independently hydrogen, hydroxy, chloro, bromo, $C_{1-4}$alkyl, $C_{1-4}$alkoxy, ($C_{1-4}$alkyl)- carbonyl, ($C_{1-4}$alkoxy)carbonyl, ($C_{1-4}$alkyl)- carbonylamino or ($C_{1-4}$alkoxy)carbonylamino, $R_4$ is nitro or cyano, and $R_5$ is chloro or bromo.

* * * * *